United States Patent [19]

Joly-Pottuz et al.

[11] 3,734,661
[45] May 22, 1973

[54] APPARATUS FOR THE CONTINUOUS MANUFACTURING OF CONSTRUCTION PANELS

[76] Inventors: Lucien Joly-Pottuz; Jean-Claude Joly-Pottuz, both of 27 Rue Bellevue, Annemasse, France

[22] Filed: Oct. 19, 1970

[21] Appl. No.: 82,030

[30] Foreign Application Priority Data

Oct. 24, 1969 France..........................6936605
Oct. 24, 1969 France..........................6936606

[52] U.S. Cl..................................425/129, 425/242
[51] Int. Cl. .........B29c 6/00, B29d 27/00, B29f 1/06
[58] Field of Search........................18/4 P, 5 P, 5 R, 18/2 RM, 2 RA, 43, 16 F, 16 P, 17 P, 17 R; 425/109, 129

[56] References Cited

UNITED STATES PATENTS

| | | |
|---|---|---|
| 2,293,914 | 8/1942 | Nanfeldt..............................264/113 |
| 3,244,783 | 5/1966 | Eissfeldt et al. ......................264/112 |
| 3,423,267 | 1/1969 | Munk................................264/112 X |
| 3,042,967 | 7/1962 | Edberg.................................18/4 P X |
| 3,203,042 | 8/1965 | Axelsson...............................18/4 P |
| 3,316,593 | 5/1967 | Neumann............................18/43 X |
| 3,323,173 | 6/1967 | Poyner.................................18/43 X |
| 3,389,196 | 6/1968 | Stahl..................................18/5 P X |
| 3,410,931 | 11/1968 | Johnson .............................18/4 P X |
| 3,466,700 | 9/1969 | Harrison ...............................18/4 P |
| 3,470,284 | 9/1969 | Hartmann............................18/43 X |

*Primary Examiner*—J. Howard Flint, Jr.
*Attorney*—Seidel & Gonda

[57] ABSTRACT

The invention relates to an apparatus for the continuous manufacture of panels that fit together, particularly intended for constructing prefabricated houses and industrial buildings.

5 Claims, 8 Drawing Figures

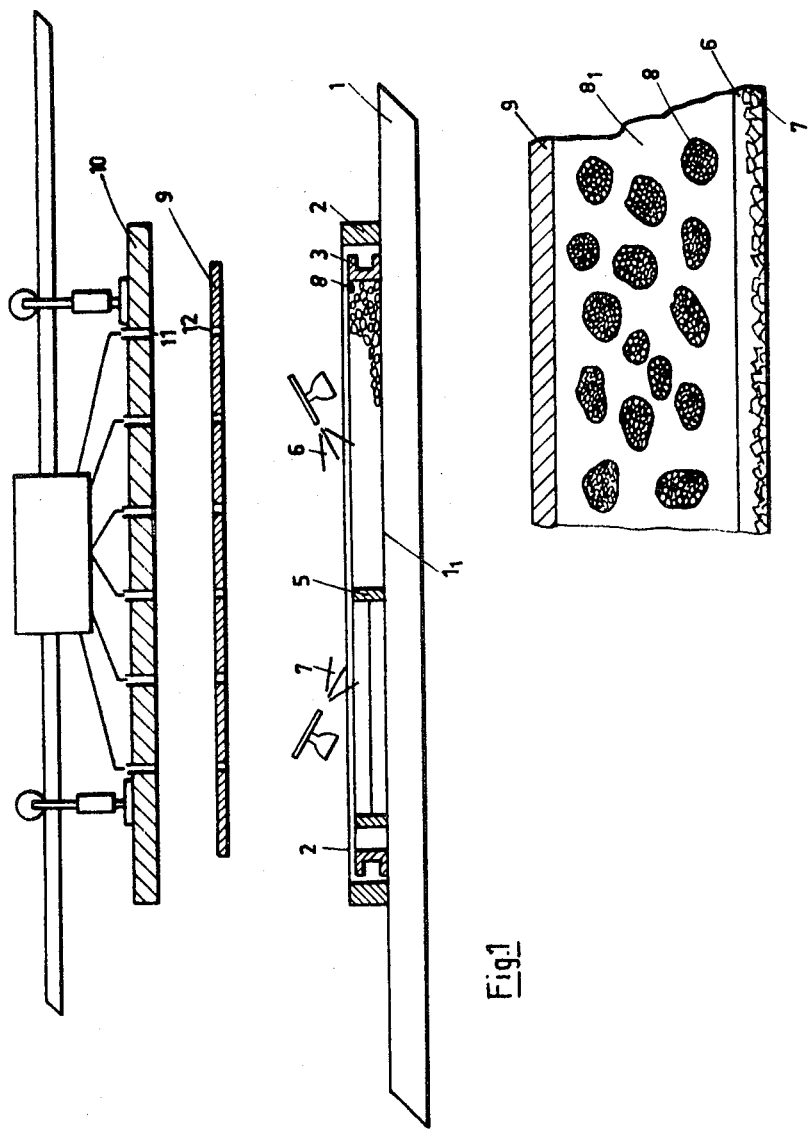

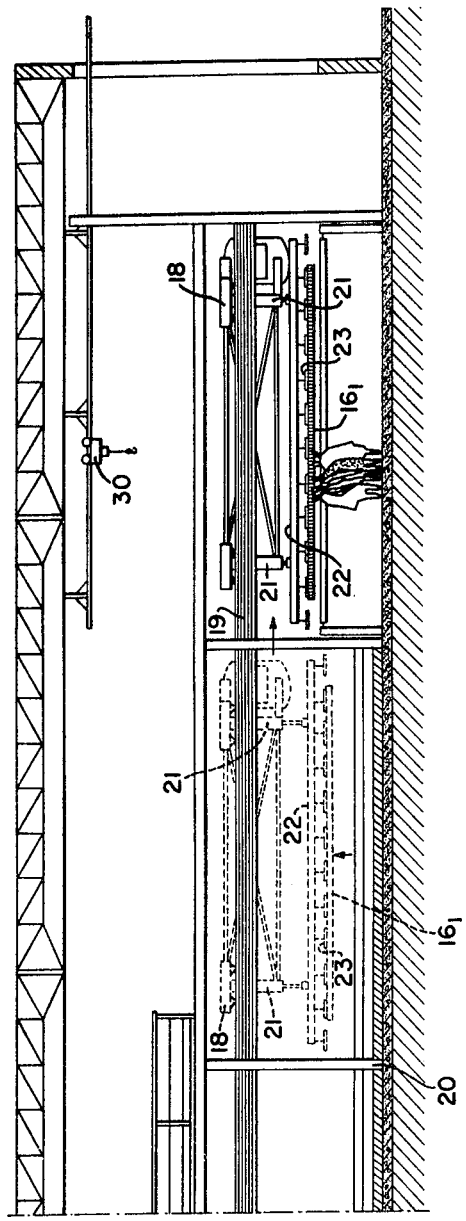

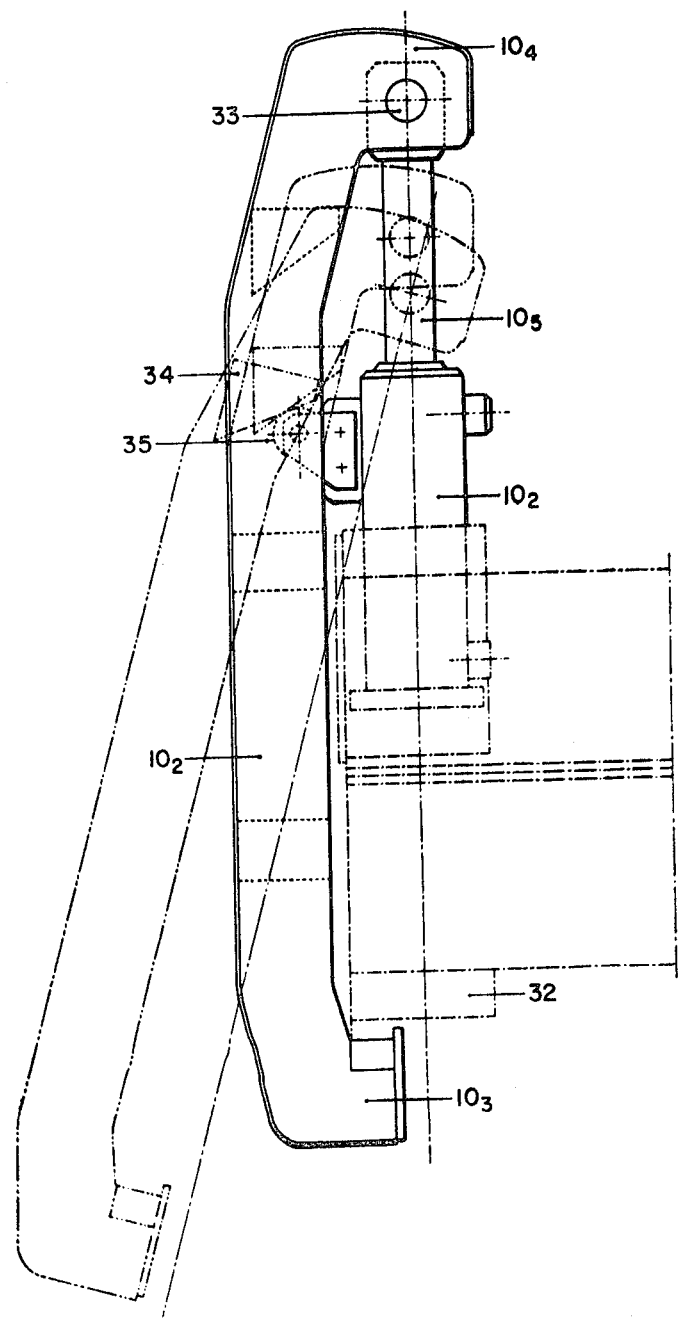

APPARATUS FOR THE CONTINUOUS MANUFACTURING OF CONSTRUCTION PANELS

The invention also relates to an apparatus for mass production of construction panels of the type that fit together. The apparatus comprises a press table of indefinite length which receives one or more panel formers shaped like frames. The panel formers determine the external dimensions of the panel to be obtained. A frame is provided within which the materials making up said panels are placed. A movable press which forms a cover for the formers is provided. It may be clamped in any part whatsoever of the press table.

Apparatus for obtaining prefabricated construction panels are shown in the accompanying drawings in which:

FIG. 1 is a section view showing diagrammatically the various elements comprising the apparatus of the assembly line.

FIG. 2 is a section view of a method of manufacturing the panel obtained by use of the apparatus in FIG. 1.

FIG. 3c is a view of the end part of a similar to FIG. 3b, but showing the transfer of a completed construction panel.

FIG. 6 is a view showing the detail of a tightening component for immobilizing the movable press in relation to a press table.

Figure 3A:
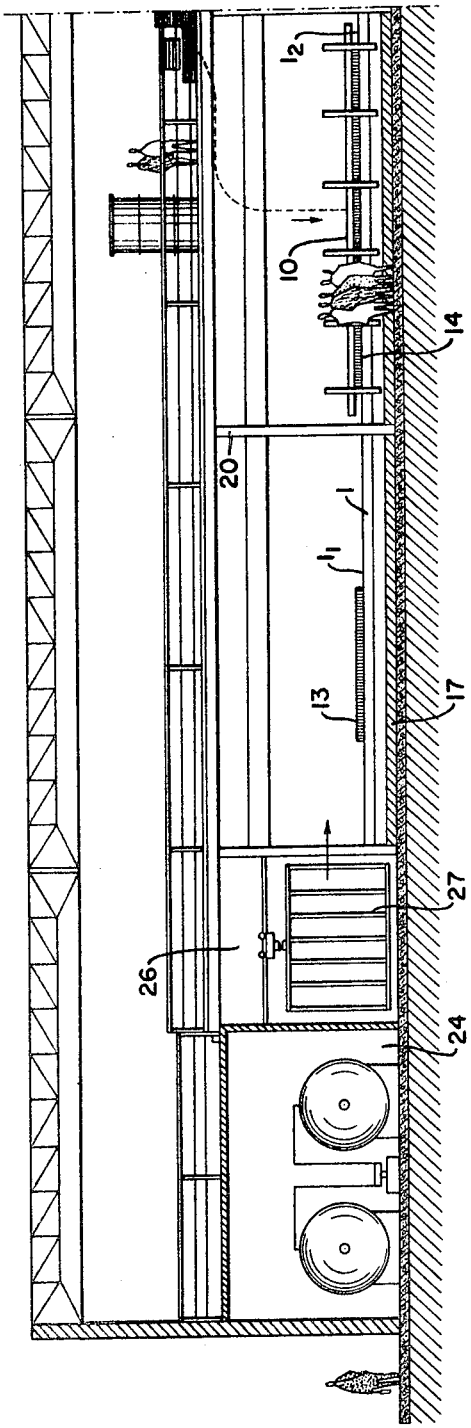
FIGS. 3a and 3b are a side elevation view in section of one embodiment of the assembly line of the apparatus.

In accordance with the invention, as shown in FIG. 1, the press comprises an elongated table 1, of indeterminate length, on which shaping elements 2 which define the outline of the panels to be made can be placed. The table 1 is long enough to receive several shaping elements 2 so that it is possible to make panels on a continuous assembly line basis.

Based on the use to which the panels are to be put, stiffening elements 3 are placed inside the shaping elements 2.

Another former comprising an internal frame 5 may be placed inside the former 2 if a panel having openings for doors and windows is desired.

After the elements 2, 3, and if need be 5, are put into position, a first facing which will form the external face of the molded panel is applied.

This facing is obtained by spreading a resin 6, for example by injection, on the surface $1_1$ of the portion of the table defined between the formers 2 and 5. Then a charge 7 of granulated material such as gravel or a mineral powder, is introduced into this resin.

Afterwards, a solid aggregate 8, preferably fireproof and with low density, for example expanded glass balls, is introduced into the space defined between the formers and, if need be, the stiffening elements 3.

The forming elements are then closed by means of a second facing 9, which may be a rigid panel made up of agglomerated fibers. Then a movable cover 10, immobilized in relation to the table 1, is placed over the formers 2 to obtain an enclosure into which a stiff polyurethane foam can be injected.

For this purpose the cover 10 has a series of injection nozzles 11 spread evenly over its entire surface. The nozzles pass through the cover to correspond with the orifices 12 in the second facing 9.

Thus injection is effected through the top of the cover 10, enabling the space defined by the formers 2 to be filled perfectly evenly, and the aggregates 8 to be perfectly evenly coated.

After reaction and drying, the panel is withdrawn from the mold by removing the movable cover 10 and the forming elements. The panel is then ready to be used, or finished off by carpentry if it includes orifices for doors or windows.

An embodiment of the panel is shown in FIG. 2, in which the first facing is made up of gravel or mineral powder coated with a polyester or polyurethane resin 6.

The aggregate 8 is made up of expanded glass balls coated with polyurethane foam $8_1$, the second facing 9 being preferably a panel of compressed fibers.

Figure 3B:
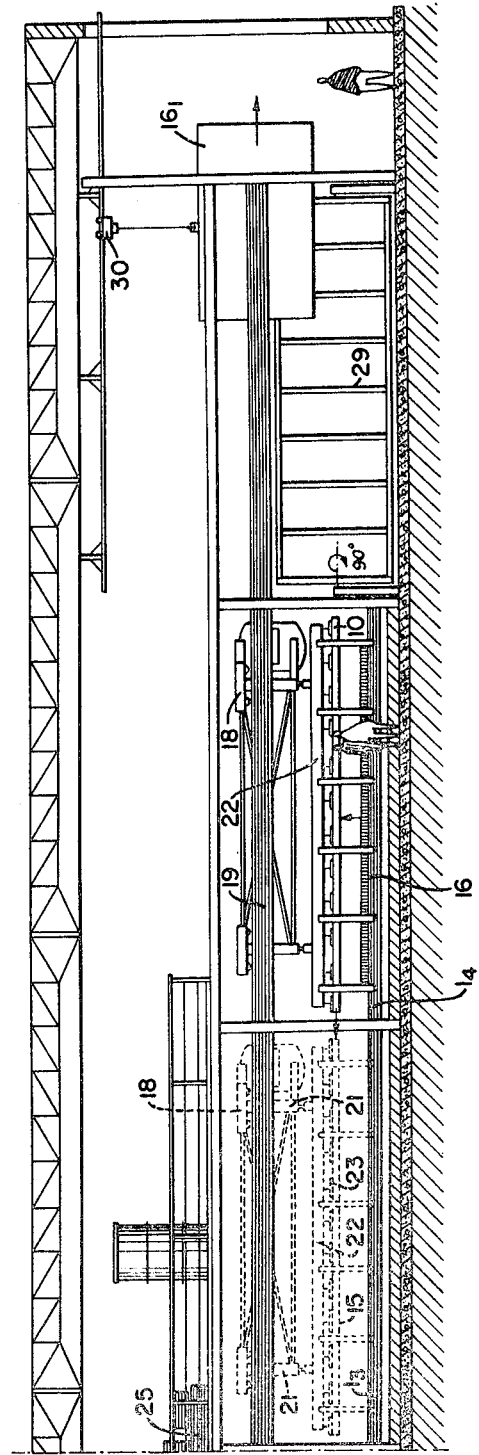

As shown in FIGS. 3a, 3b, 3c, the installation for continuous assembly line production, particularly of construction panels, comprises an elongated static press table 1. The table is longer than it is wide, so that it defines, in the example shown, several working areas $1_1$, $1_2$, $1_3$, $1_4$, on which the components making up the panels 13, 14, 15, 16 to be manufactured are placed.

The static press table rests on a concrete bed-plate 17.

The static press table co-operates with the cover 10 that can be applied and clamped to of the working areas of the table to keep the components of a panel under pressure during manufacturing.

Consequently, the cover 10 is mobile in two directions. It can move vertically to be attached to or detached from the various working areas on the static press table 1. It can move horizontally to be moved from one working area to another.

Horizontal and vertical movement of the cover 10 is obtained by an overhead crane 18 guided above and parallel to the work table 1 by rails 19 fixed to cross-beams 20 which span the assembly line.

At each end of the mobile crane 18 are vertical jacks 21. The lower ends of each jack is connected to a loading frame 22. The loading frame is provided with a series of depression suction cups 23 along its lower face which may be brought into contact with the loading surface to be transported. Such surface may be either the cover 10 that can be clamped onto the static table 1, or, after shaping, a completed panel $16_1$.

In addition, the apparatus comprises, upstream from the preparation area $1_1$, a room 24 isolated from the assembly line in which are stocked the materials from which the panels are made.

Figure 4:
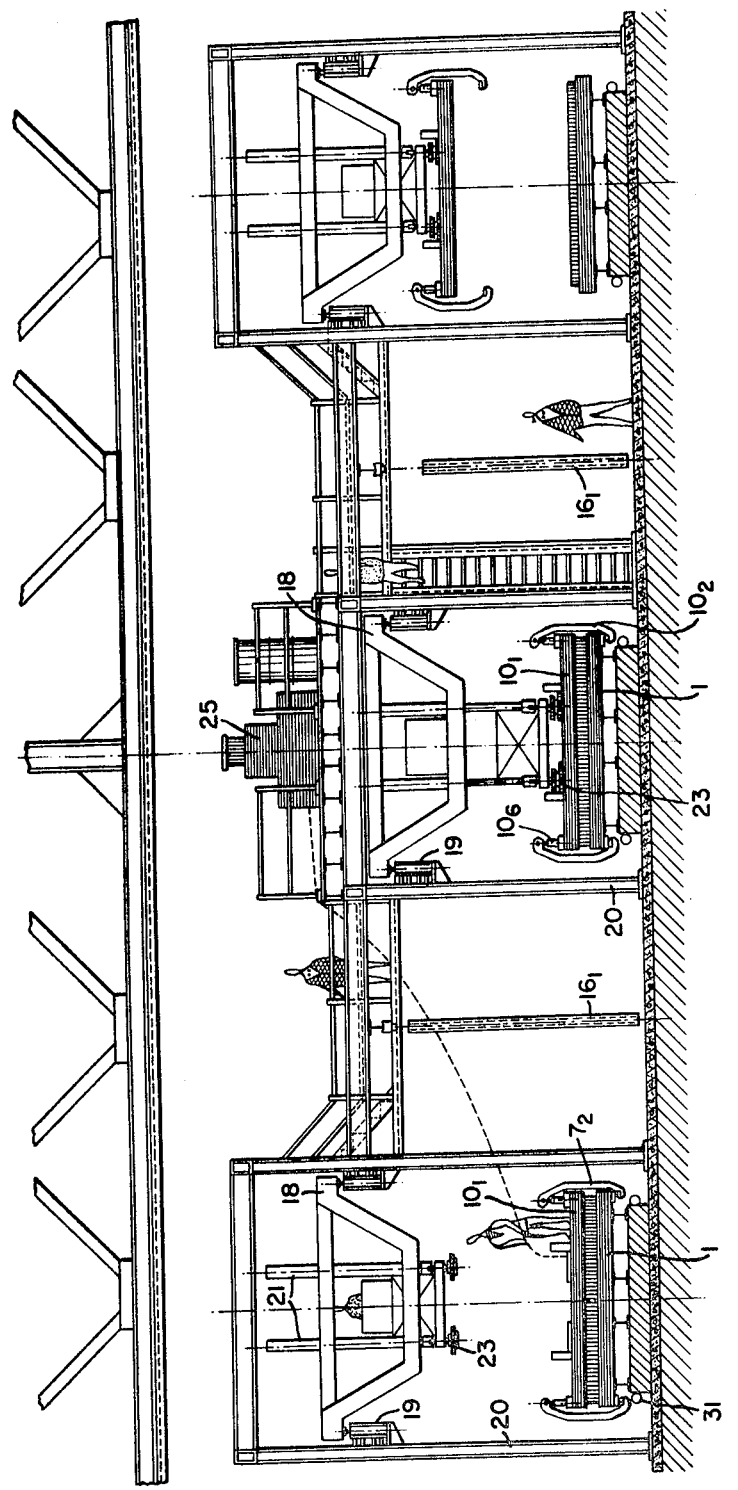
FIG. 4 is a cross-section view showing three assembly lines in accordance with the invention.

In the example illustrated, the materials stocked are resins which are brought to a distributor 25 positioned above the guide rails 19. This permits one resin supply to serve as a plurality of different injection areas which are shown in FIG. 4 to be on adjacent assembly lines. In FIG. 4 a conduit is seen running from the distributor 25 to the injection area of the assembly line on the left.

This device for conveying the constituent materials of the panels is particularly well adapted to obtain a rational distribution, whatever the type of material used.

Between the storage room 24 and the preparation area $1_1$ of the assembly line is storage area 26 in which are stocked formers 27 having the shape of metal frames for forming the framework of the panels to be manufactured.

Downstream from the assembly line, the working area $1_4$ is fitted with a pivoting table 29 which may pass from a horizontal to vertical position, so as to present the completed panels $16_1$ edgewise, and thus enable them to be taken up again for transfer to a storage place by means of a mono-rail transporter 30.

The assembly line is completed by heating elements 31 (FIG. 4), which may be vapor circulation ducts, for heating the installation's static table 1 to enable reaction of the products injected to fill the panels.

Continuous production on the assembly line for the production construction of panels is as follows:

A shaping frame 27 which determines the dimensions of the construction panel to be manufactured is placed, for example, on one of the working areas in the production chain. It is possible for several of these frames to occupy successive working areas.

Referring to working area $1_2$, the shaping element is positioned and filled with the materials constituting the panel, namely, the materials for making the facings 7, 9 and the solid aggregates 8. Then the cover 10, which is attached to the overhead crane by the suction cups 23, is put into place over the shaping frame 27.

The jacks 21 on the overhead crane enable the cover 10 to be laid on the shaping frame 27.

The cover 10 is then clamped onto the static table 1, following which the crane 18 and cover 10, are separated so that the crane 18 may effect a similar or different operation at another point in the assembly line.

The space immediately above the cover 10, which has just been clamped to the static table, is thus freed and, for example, expanded resin $8_1$ can now be injected, into the space formed by the static table 1, the shaping element 27 and the bolted cover 10.

In the embodiment described, the cover 10 is left in place after injection until the injected resins have set. The heating elements 31 on the static table enable the foam to resin to set. Then, the panel may be withdrawn from the mold and the pressure plate 10 is unclamped from the table and transferred to another, previously prepared work post. Following this, and after another maneuver by the overhead crane 18 the completed panel is deposited on pivoting table 28 at the end of the assembly line so that it can again be picked up by the mono-rail transporter 30 and taken to a storage place. In this way, assembly line production is possible, but also panels may be produced whose dimensions are limited solely by the authorized transportation dimensions.

Figure 5:
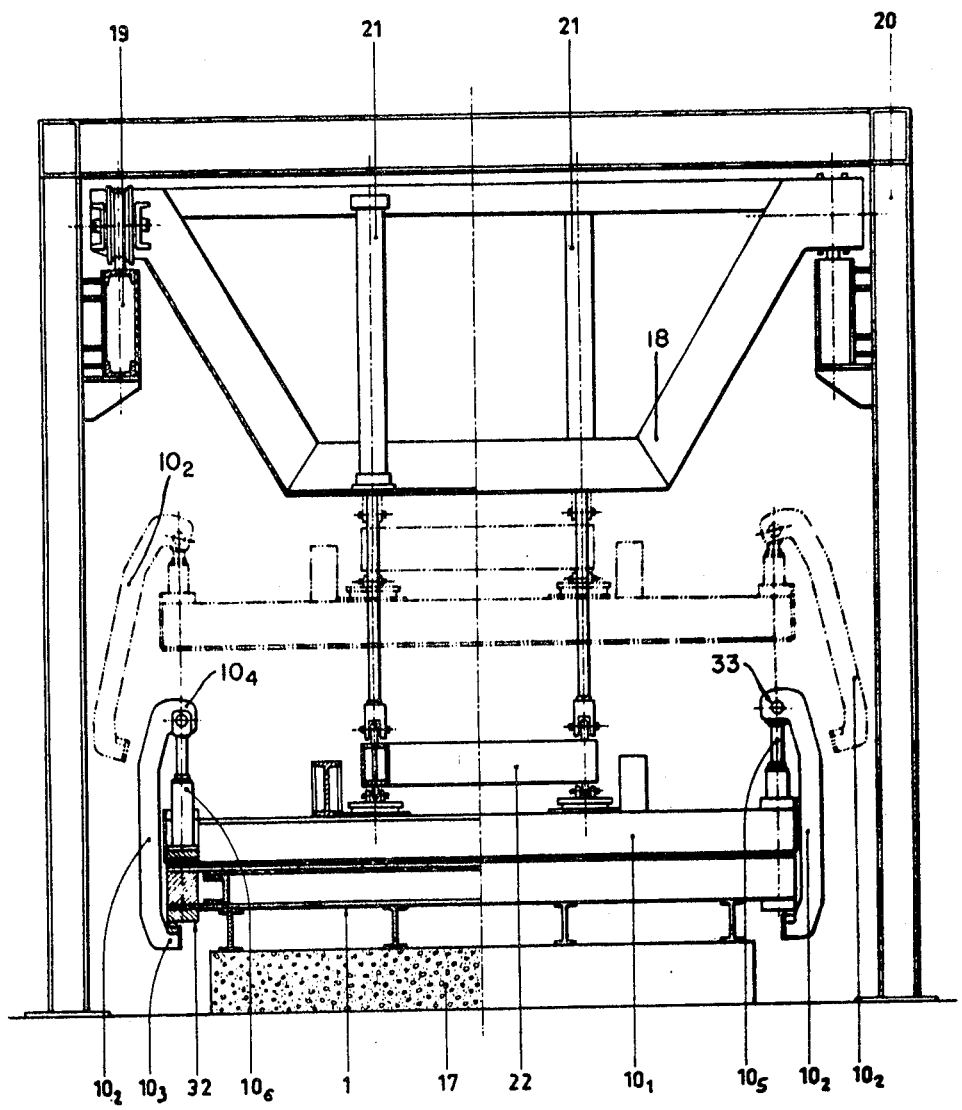
FIG. 5 is a cross-section view of one of the assembly lines showing the vertical positions of a movable press.

In accordance with a basic embodiment of the invention, the cover 10, which is applied to the materials to be pressed or contained, comprises, as shown in FIGS. 4, 5 and 6, a rigid platform 10 having a box-like shape that will not be altered when it is subjected to pressure. In accordance with a preferred embodiment, this box has a number clamping elements $10_2$ mounted around its perimeter. The precise number of clamping elements may vary and depends on the area of the platform.

The clamping elements $10_2$ comprise hooks that may be immobilized between the platform $10_1$ and a marginal support point 32 situated along the longitudinal edges of the static table 1 (FIG. 5).

In the closed position, the lower end $10_3$ of each hook rests against the marginal edge 32 of the static table. The other end of the hook $10_4$ is articulated on the stem $10_5$ of a fluid jack $10_6$. When pressure is applied to the body of jack $10_6$, the stem $10_5$ expands and the clamp $10_2$ is displaced vertically so that the hook end $10_3$ grips the marginal edge 32.

In this way, an autonomous clamping means is obtained, independent of the overhead crane 18.

Each hook $10_2$ can pivot around an axis 33, so that after its stem $10_5$ is withdrawn into its body $10_6$ to unclamp it, it assumes by broken lines (FIGS. 5 and 6) which enables the hooks to be freed from the marginal edges 32 of the static table 1. This permits removal of platform 10 by the suction cups 23 on the overhead crane 18.

The pivoting movement of hooks $10_2$ is achieved by a cam 34 which is attached to the body each of hooks $10_2$. When stem $10_5$ of jack $10_6$ is withdrawn the cam bears against a roller 35 which is attached to the body of jack $10_6$.

The installation in accordance with the invention is particularly well adapted for manufacturing elements for constructing detached houses, for example outer walls, floors, and the like.

What is claimed is:

1. An apparatus for the assembly line manufacture of construction panels comprising an elongated table, said table defining at least two work areas where construction panels can be assembled, each of said work areas being operative to support panel defining means, at least two means for defining panels, said last named means to be disposed on said table at each of said work areas, means for supplying a portion of the materials comprising the panels, means for covering said panel defining means, said cover means including a plurality of openings therethrough, conduit means coupled to said supplying means for discharging material into said panel defining means through said openings in said cover means, a crane for moving said cover means between said two work areas for selective alignment with said panel defining means in each of said work areas, a plurality of clamping elements mounted on the perimeter of said cover means for clamping said cover means to said panel defining means in each of said work areas, each of said clamping elements including energizable jack means and hook means for engaging said elongated table to urge said cover means into engagement with said panel defining means when said jack means is energized, and means on said crane for selectively coupling it to said panels and said cover means.

2. Apparatus as defined in claim 1 wherein at least one of said jack means comprises an extensible stem, first cam means supported on said jack means, said hook means being pivotally coupled to said extensible stem, second cam means on said hook means, and said first and second cam means are mutually engagable upon movement of said extensible stem to cause said hook means to engage said elongated table.

3. Apparatus as defined in claim 1 wherein said elongated table comprises heating elements for heating said table.

4. Apparatus as defined in claim 1 wherein said crane supports a plurality of suction cups for selective coupling it to the panels and said cover means.

5. Apparatus as defined in claim 4 including means for energizing said suction cups to cause them to selectively couple to said panels and cover means to be moved.

* * * * *